3,223,720
ALUMINUM PAMOATE
Silvano Casadio, Milan, Italy, assignor to Instituto de Angeli, S.p.A., Milan, Italy, a corporation of Italy
No Drawing. Filed June 7, 1963, Ser. No. 286,184
Claims priority, application Great Britain June 18, 1962
1 Claim. (Cl. 260—448)

This invention relates to a novel derivative of pamoic acid of use in combatting intestinal infections.

In the chemotherapeutic treatment of intestinal infections, it is frequently found that antibacterial substances such as, for example, antibiotics and sulphonamides, destroy the intestinal flora indiscriminately and so hinder the return of the intestine to normal functioning. It has been found however that oral administration of adsorbent substances such as charcoal or kaolin leads to removal of the unwanted organisms with less destruction or removal of the normal intestinal flora.

It is also useful, especially in the treatment of intestinal disorders leading to diarrhoea, to reduce the intestinal peristalsis.

I have now found that a certain novel salt of pamoic acid possesses the property of absorbing unwanted bacteria in the intestine coupled with useful antiperistaltic activity.

According to the present invention, therefore, I provide an aluminum salt of pamoic acid.

It will be appreciated that the salt of pamoic acid provided by the invention is the compound obtainable by conventional salt-forming processes. The exact chemical structure of the salt is believed to be of the formula

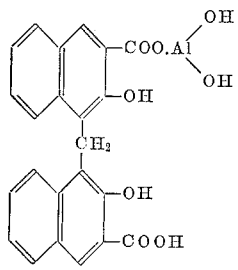

The compound according to the invention possesses low chronic and acute toxicity, and several grams per kilogram of body weight can readily be tolerated. On oral and parenteral administration to rats, in suspension in gum arabic, the $LD_{50}$ was found to be $>5$ g./kg. for the aluminum salt. Chronic toxicity tests on growing rats at a dose rate of 1.5 g./kg. per day showed no difference from control results over 90 days.

The antibacterial action of the compound according to the invention was studied using standard tablets of the pamoate laid on agar bacterial preparations and measuring the diameters of the inhibition zones.

In tests carried out on 4 strains of Staphylococcus, 3 strains of E. coli, 3 strains of Salmonella, 1 strain of Shigella, 1 strain of Proteus and 1 strain of B. mesentericus, aluminum pamoate did not show any permanent antimicrobial activity against any of the strains.

In contrast with these results aluminum pamoate, showed marked high absorbing power for bacteria. The absorption tests were carried out on the product under examination, using kaolin and wood charcoal as controls. The 3 products under test were added, in amounts of 20 and 200 mg. per 10 ml. of microbic suspension respectively to microbic suspensions (Staphylococcus enterotoxic, Staphylococcus aureus, E. coli, Shigella flexneri.) After a contact time of 30 minutes with stirring, the suspensions were allowed to settle; the supernatant was removed, diluted to a dilution of $1 \times 10^{-3}$ and to $1 \times 10^{-4}$, and seeded in Petri dishes which contained a nutrient fluid agar preparation. The results were examined in comparison with controls, which were prepared with the microbic suspension alone.

Aluminum pamoate appears to be a strong absorbent for all of the four strains tested, particularly at the highest concentrations; its activity is greater than that of kaolin and of 8-hydroxyquinoline pamoate, and considerably greater than that of charcoal. The reduction of the microbial content in the suspension is most probably due to the absorbing action of the aluminum pamoate rather than to its antibacterial action. The results are set out in Table I.

The action of aluminum pamoate according to the invention on peristalsis and on intestinal motility has also been studied "in vitro" on isolated intestines of rabbits, by the technique of R. Magnus (Pflügers Arch., 102, 123, 1904.) Even at a concentration of $10^{-4}$ g./ml. it causes a decrease in the amplitude of the spontaneous contractions, down to total disappearance.

The Jansen test (J. Pharm. Pharmacol., 9, 381, 1957) was also used "in vivo" on the rat; an oral dose of 200 mg./kg. of aluminum pomoate and a standard suspension of charcoal, given by means of a probe one hour later, were administered to 50 animals of an average weight of 20–22 g. divided into 5 groups of 10 animals each, which had been kept fasting for 18 hours.

In the controls, an equal volume of the liquid used as suspending medium (2% solution of gum arabic) was substituted for the treatment with the pamoate. From the data which has been collected it can be seen that aluminum pamoate, in the doses which were used, considerably changes the intestinal motility (58% of white appendices in the treated animals, compared to 5% in the control animals; the change in motility is considered significant when no charcoal is contained in the appendices of the animals killed two hours after their charcoal meals). The results of these tests are shown in Table II.

These pharmacological results have been confirmed by clinical tests carried out in children (18 cases) and in adults (10 cases) who were suffering from diarrhoea caused by pathogenic colibacteria, acute, probably enteric, diarrhoea, or acute enteric diarrhoea with evidence of dehydration. The products according to the invention were used in doses of 0.5 to 20 mg./kg. of body weight, corresponding to a daily total dose of 5 to 200 mg./kg.

The invention further provides pharmaceutical compositions suitable for oral administration comprising, as active ingredient, the compound according to the invention which may be utilized in combination with bismuth pamoate or 8-hydroxyquinoline pamoate and is in association with a pharmaceutical carrier or excipient. The compositions may be in solid or liquid form and preferably contain between 0.25% and 50% by weight, advantageously between 5 and 25% by weight, of active ingredient. Suitable forms of solid compositions include, for example, powders or granules. Preferably, however, the solid compositions may be in the form of dosage units, each dosage unit preferably containing 10 to 500 mg., advantageously 50 to 200 mg. of active ingredient. Particularly useful dosage unit forms include tablets, coated tablets, pills, capsules, or cachets. Suitable carriers or excipients for solid compositions include, for example, lactose, starches (particularly corn, maize and soluble starches), silica and magnesium stearate.

The liquid compositions for oral administration include syrups and suspensions, suitable liquid carriers including water together with sweetening, thickening, dispersing, flavoring and/or other agents.

The pharmaceutical compositions, in addition to the compound according to the invention, may also contain substances also of value for treating infections of the intestine, for example, antibiotics (e.g. neomycin, bacitracin and streptomycin), sulphonamides (e.g. succinylsulphathiazole, phthalylsulphathiazole and formosulphamides), vitamins of the B group, other antibacterial compounds (e.g. nitrofuranics) and absorbent substances (e.g. kaolin). In some cases, for example when kaolin is used, the additional substance may itself serve as carrier or excipient.

The compound according to the invention may be prepared in any convenient way, e.g. by conventional salt-forming procedures.

According to one feature of the invention, we provide a process for the preparation of the compound according to the invention which comprises reacting pamoic acid, or a salt thereof, with an aluminum compound to form the desired salt. The process is conveniently carried out in the presence of a solvent, advantageously a polar solvent, for the reactants. A particularly useful solvent is water and the reaction is preferably carried out at elevated temperatures.

The aluminum salt according to the invention is preferably prepared by reacting a salt of pamoic acid with an aluminum salt, for example, aluminum chloride or a salt thereof such as the sulphate or citrate. Suitable salts of pamoic acid for use in these processes include alkali metal salts e.g. the sodium salt.

In order that the invention may be well understood we give the following examples by way of illustration only:

EXAMPLE 1

500 ml. of a boiling aqueous solution of 164 g. (0.68 mole) of aluminum chloride hexahydrate are added slowly with stirring to a boiling solution of 295 g. (0.68 mole) of sodium pamoate in 4 litres of water. The mixture is boiled for 60 minutes. A yellow precipitate is formed at first, which soon turns to an intense green color. The mixture is cooled, filtered, carefully washed with cold water and the product is then suspended in water and the suspension stirred for a long time. The mixture is filtered again, and washed with water until it is free from chloride ions. When dried under vacuum, aluminum pamoate is obtained in the form of green powder. The yield is 220 g. The product has a sweetish taste and is insoluble in most common organic solvents.

*Analysis.*—Found, percent: C, 59.55; H, 3.77; Al, 5.81. Calc., percent: C, 61.62; H, 3.82; Al, 6.02.

EXAMPLE 2

Powders—cachets: G.
  Aluminum pamoate _____ 100
  8-hydroxyquinoline pamoate _____ 20
  Kaolin _____ 280

The homogeneous mixture of the three components is divided into 1000 doses; each dose of the powder contains 100 mg. of aluminum pamoate, and 20 mg. of 8-hydroxyquinoline pamoate.

EXAMPLE 3

Syrup suspensions: G.
  Aluminum pamoate _____ 20
  Kaolin _____ 100
  Pectin N.F. _____ 10
  Sodium benzoate _____ 3.5
  Sodium saccharine _____ 0.65
  Softened water, q.s. up to 1000 ml.

10 ml. of the homogeneous suspension contain 200 mg. of aluminum pamoate.

EXAMPLE 4

Tablets—pills: G.
  Aluminum pamoate _____ 100
  8-hydroxyquinoline pamoate _____ 20
  Lactose _____ 130
  Gum arabic _____ 15
  Magnesium stearate _____ 5

The mass, from which 1000 tablets may be prepared, is suitably handled by damp or dry methods, and is then subjected to a compression; each tablet of weight 0.270 g. contains 100 mg. of aluminum pamoate and 20 mg. of 8-hydroxyquinoline pamoate. The tablets which are thus obtained may be coated with sugar and formed into pills according to conventional techniques.

EXAMPLE 5

Capsules: G.
  Bismuth pamoate _____ 75
  Aluminum pamoate _____ 75
  Starch _____ 50
  Lactose _____ 45
  Magnesium stearate _____ 5

The homogeneous mass is divided into 1000 capsules; each capsule contains 75 mg. of bismuth pamoate and 75 mg. of aluminum pamoate.

*Table I*

|  | Mg in 10 ml. | Percent decrease of the microbial content | | |
|---|---|---|---|---|
|  |  | Staphylococcus (Two strains) | Escherichia coli | Shigella flexneri |
| Aluminum pamoate | 20 | 51.2 | 98.8 | 14 | 87.4 |
|  | 200 | 93.9 | 98.8 | 95.5 | 99.7 |
| Bismuth pamoate | 20 | 49.5 | 97.5 | 24.1 | 99.7 |
|  | 200 | 99.6 | 98.5 | 99.9 | 99.9 |
| 8-hydroxy-quinoline pamoate | 20 | 37.8 | 98.2 | 11.6 | 67.9 |
|  | 200 | 32.7 | 99 | 10 | 79 |
| Kaolin | 20 | 83.4 | 81.9 | 55 | 52.6 |
|  | 200 | 99.8 | 99 | 98.5 | 70.7 |
| Activated wood charcoal | 20 | 42.9 | 23.7 | 10 | 74 |
|  | 200 | 44.6 | 94.2 | 31 | 99 |
| Control |  | 0 | 0 | 0 | 0 |

*Table II*

| Group No. | Animals No. | Treatment | No. animals showing white appendices | Percent white appendices |
|---|---|---|---|---|
| I | 10 | Gum arabic | 0/10 | 0 |
| II | 10 | ___do___ | 1/10 | 10 |
| III | 10 | ___do___ | 1/10 | 10 |
| IV | 10 | ___do___ | 0/10 | 0 |
| Total I–IV | 40 | ___do___ | 2/40 | 5 |
| V | 10 | Pamoate | 6/10 | 60 |
| VI | 10 | ___do___ | 5/10 | 50 |
| VII | 10 | ___do___ | 6/10 | 60 |
| VIII | 10 | ___do___ | 6/10 | 60 |
| IX | 10 | ___do___ | 6/10 | 60 |
| Total V–IX | 50 | ___do___ | 29/50 | 58 |

(References on following page)

I claim:
The aluminum salt of pamoic acid of the formula
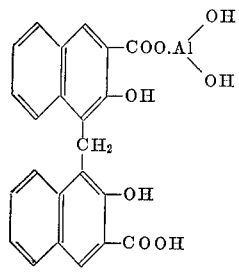
References Cited by the Examiner
UNITED STATES PATENTS
| | | | |
|---|---|---|---|
| 985,559 | 2/1911 | Turner | 260—447 |
| 2,752,342 | 6/1956 | Smith et al. | 260—289 |
| 2,772,264 | 11/1956 | Yaeger | 260—448 |
| 2,777,874 | 1/1957 | Asseff | 260—448 |
| 2,852,518 | 9/1958 | Morgan | 260—286 |
| 2,917,430 | 12/1959 | Baltzly | 167—55 |
| 2,997,476 | 8/1961 | Caldwell | 260—286 |
| 3,062,714 | 11/1962 | Pitkin | 167—55 |
| 3,067,242 | 12/1962 | Larrabee | 260—501 |
NICHOLAS S. RIZZO, *Primary Examiner.*
FRANK CACCIAPAGLIA, JR., *Examiner.*